(12) United States Patent
Specht et al.

(10) Patent No.: US 6,186,549 B1
(45) Date of Patent: Feb. 13, 2001

(54) DEVICE FOR TENSIONING A VEHICLE SEAT BELT

(75) Inventors: Martin Specht, Feldafing; Stephan Schwald, Herrsching; Michael Bär, München, all of (DE)

(73) Assignee: Breed Automotive Technology, Inc., Lakeland, FL (US)

( * ) Notice: Under 35 U.S.C. 154(b), the term of this patent shall be extended for 0 days.

(21) Appl. No.: 09/460,874

(22) Filed: Dec. 14, 1999

(30) Foreign Application Priority Data

Jun. 16, 1999 (DE) .............................................. 199 27 513

(51) Int. Cl.$^7$ .................................................. B60R 22/195
(52) U.S. Cl. .......................... 280/806; 60/632; 248/503.1
(58) Field of Search .................................... 280/806, 805, 280/801.1; 297/464, 468, 480; 60/632; 248/352, 503, 503.1, 563

(56) References Cited

U.S. PATENT DOCUMENTS 5,519,997   5/1996   Specht et al. .......................... 60/632

FOREIGN PATENT DOCUMENTS

| 8529017 | 10/1985 | (DE) . |
| 4332206 | 9/1993 | (DE) . |
| 0785113 | 7/1997 | (EP) . |

*Primary Examiner*—Eric Culbreth
(74) *Attorney, Agent, or Firm*—Lonnie Drayer

(57) ABSTRACT

A seat belt tensioner has two traction strands which transmit a tensioner drive movement to a seat belt. A block-shaped deflection device, which is anchored on the vehicle body has a guide channel. The block-shaped deflection device is fixed in an interlocking manner in a fastening sleeve anchored to the vehicle body.

18 Claims, 4 Drawing Sheets

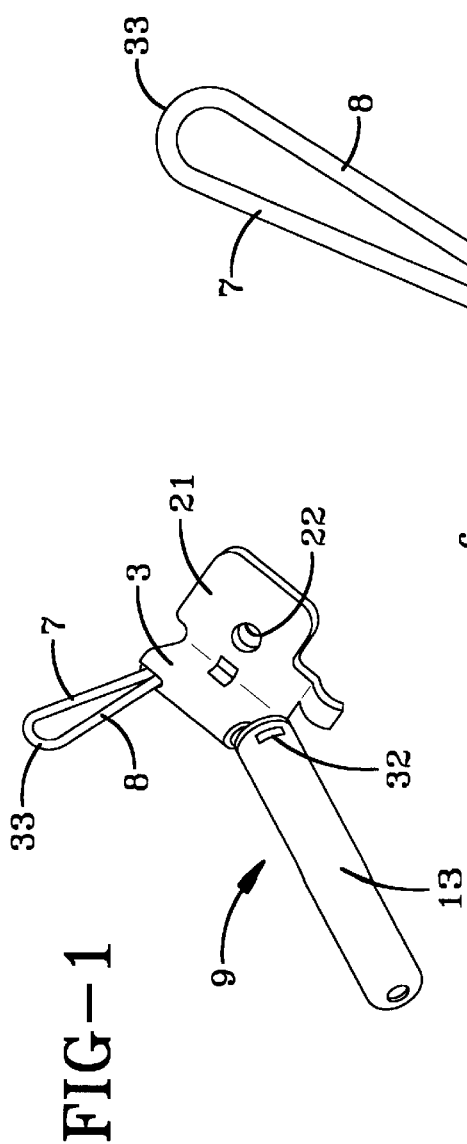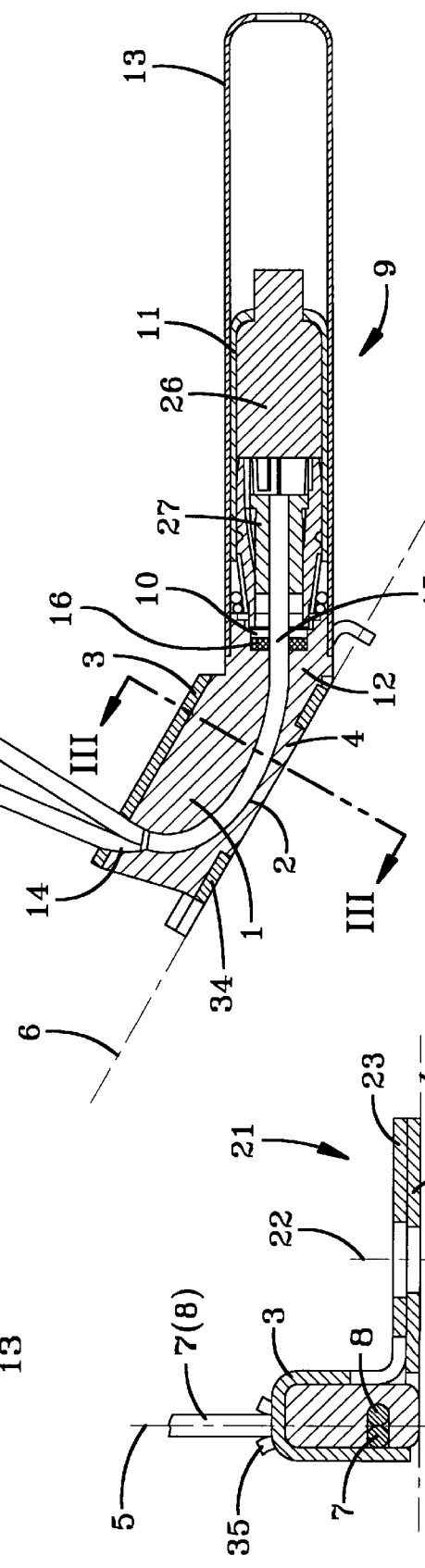

DEVICE FOR TENSIONING A VEHICLE SEAT BELT

FIELD OF THE INVENTION

The invention relates to an apparatus for tensioning a vehicle seat belt.

DISCUSSION OF THE PRIOR ART

An apparatus for tensioning a vehicle seat belt known from U.S. Pat. No. 5,519,997 has a tensioner drive that is connected to the seat belt via a traction means and transmits a tensioner drive movement to the seat belt. In the known arrangement, the traction means is connected to a buckle in which the seat belt can be locked and is deflected between the tensioner drive and buckle in a deflection device anchored on the vehicle body. The deflection device possesses a guide channel that is guided round the anchoring point of the deflection device. The guide channel for the traction means extends in a substantially vertical guide plane parallel to the longitudinal direction of the vehicle. The anchoring point of the deflection device is designed as a bore hole through which an anchoring bolt is inserted and fastened on the seat slide of a vehicle seat by a screw connection.

A device for tensioning back seat belts in a motor vehicle is also known from DE 85 29 017 U1, in which the traction means comprising two traction strands is guided over a block-shaped deflection device. At the traction means inlet end of the guide channel formed in the deflection device, the two traction strands connected to the buckle of the seat belt are arranged side by side in a plane extending substantially parallel to the longitudinal direction of the vehicle. The two traction strands are rotated through 90° in the deflection device so they are arranged on top of one another in a vertical plane at the traction means outlet end of the deflection device. A plurality of belt buckles of the back seat belts can be bound to the two traction means strands for common tensioning. To obtain perfect anchoring of the cable deflection on the vehicle body, in particular the vehicle sub-floor, it is necessary to provide at least two anchoring points for the cable deflection.

SUMMARY OF THE INVENTION

In accordance with the present invention the deflection device is block-shaped and comprises one block piece or a plurality of block pieces assembled in an interlocking manner with an interlocking fit provided by a fastening sleeve anchored on the vehicle body at a single anchoring point and fixed in the sleeve. For this purpose, a structure is provided on the exterior of the block-shaped deflection device, which projects with an interlocking fit into at least one of the walls of the fastening sleeve embracing the deflection device. The structure preferably projects into a wall of the fastening sleeve located in an anchoring plane, within which the anchoring point of the fastening sleeve is located. The anchoring plane extends substantially perpendicularly to the guide plane in which the guide channel for the traction means extends in the block-shaped deflection device. The anchoring point of the fastening sleeve is preferably formed by a borehole in a fastening tab shaped integrally on the fastening sleeve. The fastening tab extends in the anchoring plane and preferably comprises an orifice through which an anchoring bolt is screwed in a known manner to the vehicle body, in particular in the region of the sub-floor.

The fastening sleeve embraces the block-shaped deflection device substantially in the form of a box with an interlocking fit. In this way, all forces that originate from the seat belt, in particular also in the event of a crash, are introduced into the vehicle body without destruction in the smallest amount of space.

A plurality of tensioner devices can be arranged in the back bench or back seat region of the motor vehicle, in the manner shown in the embodiment in FIG. 10 of EP 0 785 113 A1.

A dust-free arrangement of the deflection device is achieved owing to the substantially box-shaped interlocking embracing of the deflection device. The traction means preferably consists of two traction strands, in particular steel cables with a diameter of about 4 mm. The arrangement of the two traction strands is rotated through about 90° along the guide channel. The rotation ensures that the two strands of the traction means are guided over the same deflection radius in the guide channel. In the loaded phase, for example during retensioning or during a crash, substantially identical forces act on the two strands of the traction means.

For careful introduction of the two traction strands into the deflection device, a guide funnel can be shaped in the block of the deflection device at the inlet end of the guide channel and is continued at the corresponding point in the cover of the fastening sleeve. Additional stiffening for the introduction of the two strands of the traction means into the guide channel is thus achieved.

A linear drive comprising a piston guided linearly during the tensioning movement in a guide tube is preferably used for the tensioner drive. The tensioner drive also possesses a pressure chamber which is formed on the back of the piston and in which a propellant gas can be introduced for driving the piston. The propellant gas can be produced by an ignited propellant, for example in a gas generator. The gas generator can preferably be arranged in the piston, as known from DE 43 32 206 C2. However, it is also possible to provide the gas generator in the wall of the tube or at the deflection device or a different suitable point outside the guide tube and to introduce the propellant gas into the pressure chamber via a corresponding channel.

In normal operation, the guide tube and piston are preferably fixed on an attachment shaped integrally on the block-shaped deflection device. The attachment can comprise a recess from which the pressure chamber is formed at least in part and in which the piston is supported and held.

The piston is fixed in the recess of the attachment preferably with a specific holding force so that an uncontrolled advance of the traction means is prevented during normal operation. A piston fixing ring can be provided for fixing the piston in the recess of the attachment. This ensures that the piston is released from the holding ring only by a specific take-off force, particularly if a specific working pressure is produced in the pressure chamber by the propellant gas.

BRIEF DESCRIPTION OF THE DRAWINGS

The invention is described in more detail with reference to an embodiment shown in the figures, in which:

FIG. 1 is a perspective view of an embodiment of the invention;

FIG. 2 is a longitudinal section through the embodiment;

FIG. 3 is a sectional view along a section line III—III in FIG. 2;

DETAILED DESCRIPTION OF THE INVENTION

Figure 4:
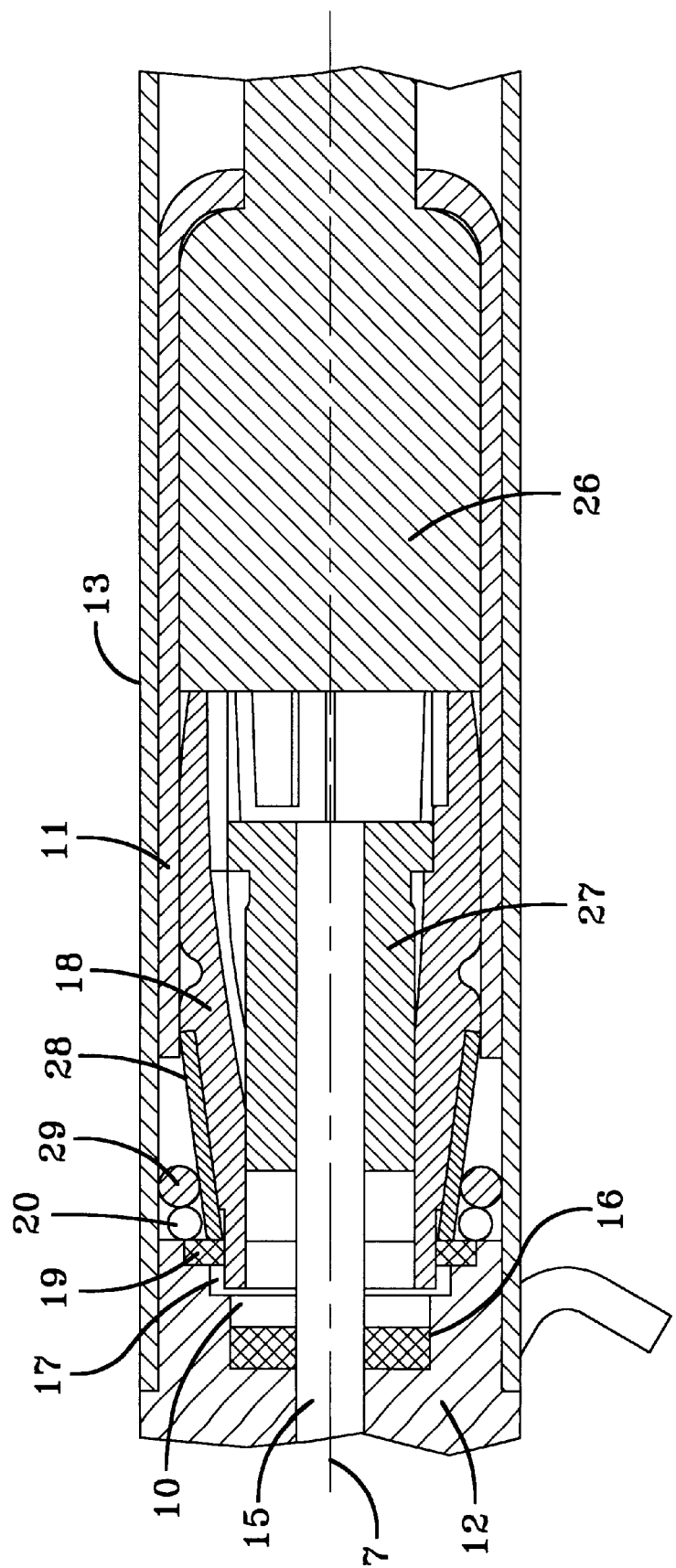
FIG. 4 is an enlarged sectional view of the tensioner drive and its fastening on the deflection device of the embodiment.

The embodiments shown in the figures for the tensioning of a seat belt, in particular a seat belt provided on the back bench or back seat of a vehicle possesses a tensioner drive 9 which, as a linear tensioner drive, comprises a piston 11 guided in a guide tube 13. For driving the piston 11, a propellant gas produced, for example, pyrotechnically or originating from a hybrid gas generator is introduced in a pressure chamber 10 provided on the back of the piston 11. In the embodiment illustrated, a gas generator 26 is located in the piston 11 of the tensioner drive. The tensioner drive can be designed, for example, in the manner known from DE 43 32 206 C2 or U.S. Pat. No. 5,519,997.

In the piston 11, a traction means with two traction means strands 7, 8 is anchored via a cable pressing means 27. The traction means strands can be formed by steel cables with diameters of about 4 mm. The two traction means strands 7, 8 are guided through a guide channel 2 in a block-shaped deflection device from the tensioner drive to a binding point on a seat belt not shown in detail. To simplify the binding of the traction means (traction means strands 7 and 8) to the seat belt, the traction means strands 7, 8 are shaped to a traction means loop 33. The traction means loop 33 can be rigidly connected to a buckle, not shown in detail, of a seat belt or to an end fitting of a seat belt. The traction means loop 33 is preferably connected to a buckle of a seat belt, as shown in U.S. Pat. No. 5,519,997.

In the embodiment illustrated, a deflection device 1 is formed by an integral deflection block. However, the block-shaped deflection device 1 can be formed by two or more block pieces that are joined together in an interlocking manner. The deflection device 1 contains the guide channel 2 for the traction means (traction means strands 7 and 8). The deflection device 1 is box-shaped and is embraced in an interlocking manner by a fastening sleeve 3. The fastening sleeve 3 is open at both its ends and surrounds the guide channel 2. The deflection device 1 possesses a structure 4 on its exterior, in particular on its underside. In the embodiment illustrated, the structure 4 is designed as a rectangular projection on the external face of the deflection device. The structure 4 rests with an interlocking fit in a corresponding recess in the fastening sleeve 3. In the embodiment illustrated, the recess is located in a base plate 34 which forms one of the walls of the fastening sleeve embracing the deflection device 1 in a fixing manner. The base plate 34 and the structure 4 projecting in an interlocking manner therein are located in an anchoring plane 6. The external surface of the structure 4 and the external surface of the base plate 34 are flush so that, on the body side, they can be placed flush in the anchoring plane 6 on a corresponding support or anchoring face of the vehicle body, in particular in the region of the sub-floor.

A fastening tab 21 is shaped integrally on the fastening sleeve 3. The fastening sleeve 3 and the fastening tab 21 can be formed by a correspondingly shaped piece of sheet metal. The underside of the fastening tab 21 is also located in the anchoring plane 6. The fastening tab 21 can be formed in two layers, two layers 23, 24 of the piece of sheet metal from which the fastening sleeve 3 and the fastening tab 21 are formed being placed on top of one another (FIG. 3). An aperture 22 is provided in the fastening tab 21 into which a fastening bolt can be inserted for anchoring purposes, the anchoring bolt optionally being anchored on the vehicle body by a screw connection. In the anchoring plane 6, a flat support for the device consisting of tensioner drive and deflection device is achieved in this way, using only one anchoring means, for example a fastening bolt.

With this arrangement, all forces acting on the seat belt are reliably absorbed and introduced into the vehicle body, for example into the sub-floor.

The two traction means strands 7, 8 are guided through the deflection device 1 in a guide plane 5 which is perpendicular to the anchoring plane 6 and extends substantially parallel to the longitudinal axis of the vehicle (FIG. 3). As shown in the figures, the two traction means strands 7, 8 are located in succession in the guide plane 5 on the inlet side, i.e. on the side on which they are connected to the seat belt via the loop 3. In the region of a traction means inlet end 14 of the guide channel 2, the arrangement of the two traction means strands 7, 8 is rotated through 90° along the guide section in the guide channel 2. This rotation ensures that the two traction means strands 7, 8 are deflected with the same radii of curvature in the deflection device 1. At the traction means outlet end 15 and in the region in which the guide channel 2 extends in a curved manner, the two traction means strands 7, 8 lie side by side in parallel, as shown in the sectional view in FIG. 3. When loaded during tensioning and during a crash, substantially identical forces act on the two traction means strands 7, 8. The deflection angle of the traction means is <90° and is between about 60° and 70°. The guide channel 2 possesses two deflection radii. The part of the guide channel 2 adjacent to the traction means inlet end 14 possesses a smaller radius of curvature than the adjoining channel part at the traction means outlet end 15. The smaller radius of curvature is about 20 mm and the channel part extending to the traction means outlet end 15 has a radius of curvature of about 46 mm.

For careful introduction of the traction means into the guide channel 2 of the deflection device 1, in particular during tensioning, a guide funnel 35 (FIG. 3) is shaped on the fastening sleeve 3. Additional stiffening for introduction of the traction means is thus achieved.

Figure 5:
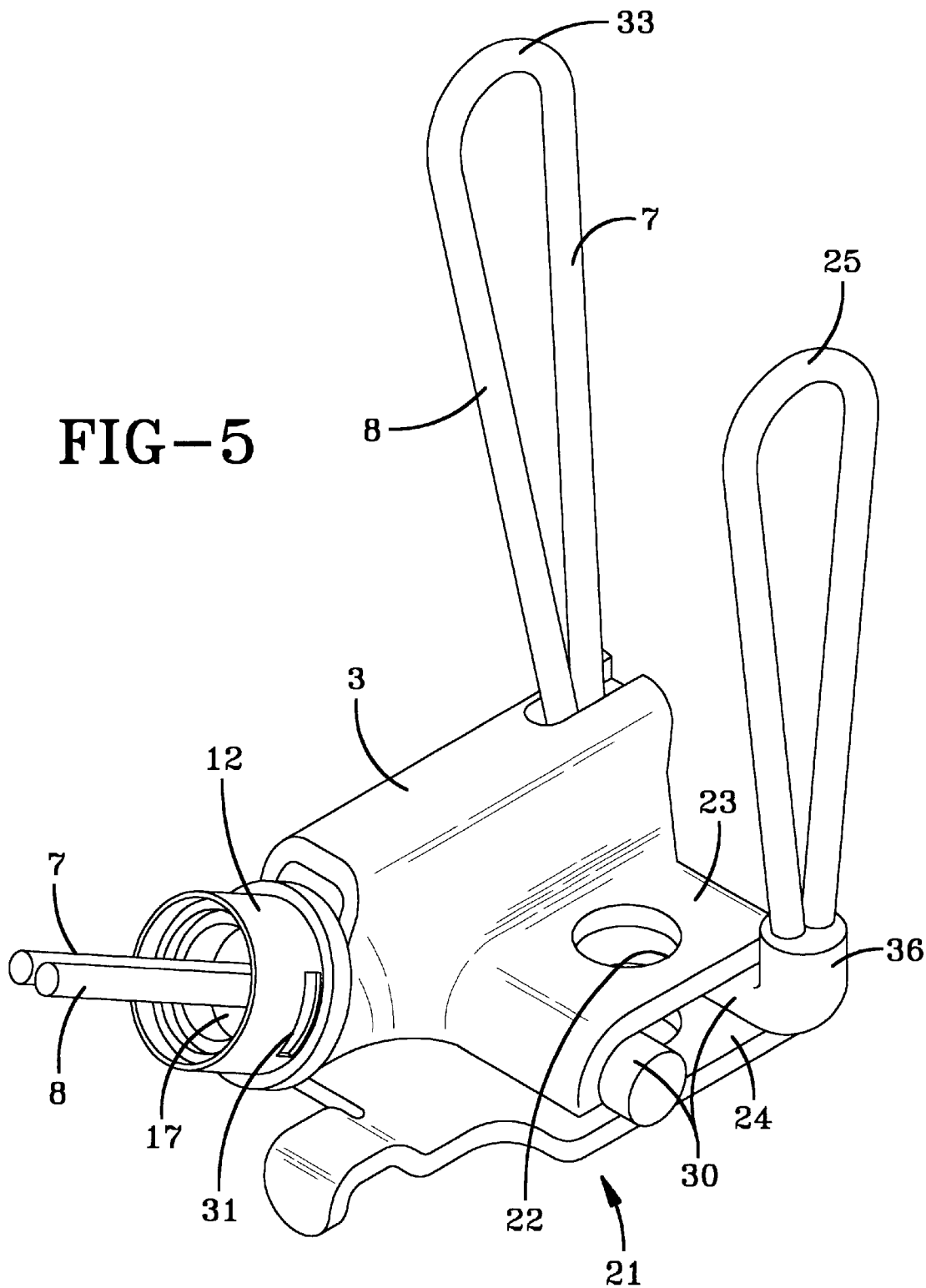
FIG. 5 is a perspective view of a further embodiment.

An attachment 12 is shaped integrally on the block of the deflection device 1. This attachment 12 is used for fastening the tensioner drive 9 on the deflection device 1. For this purpose, the guide tube 13 is placed in an interlocking manner on the exterior of the attachment 12. Indentations 31 that preferably extend only over a portion of the periphery of the cylindrical attachment 12 and can be diametrically opposed are located in the attachment (FIG. 5). The material of the guide tube 13 is pressed in an interlocking manner into these groove-shaped indentations 31 so that corresponding impressions 32 are formed (FIG. 1). It is also possible to provide peripheral groove-shaped recesses on the attachment 12 and to impress the material of the applied guide tube into these indentations, for example by rolling.

The attachment 12 is pot-shaped in design and, for this purpose, has a recess 17 which completely or partially forms the volume of the pressure chamber 10 on the back of the piston 11. On the bottom of the recess 17 is a sealing washer 16 which ensures that the pressure chamber 10 is sealed from the traction means outlet end 15 of the guide channel. A supporting step in which a piston fixing ring 19 is inserted in an interlocking manner is also provided for fixing the piston 11 at its rear piston end 18. The piston fixing ring 19 embraces the piston end 18 which preferably comprises a conical external surface. The cone tapers from the piston 11 to the rear end of the piston. The piston can optionally be hollow in design in the region of its piston end 18, as in the embodiment, so that the pressure chamber 10 is enlarged. During assembly, the piston fixing ring 19 is fixed with an interlocking fit with a defined holding force, for example with a driving fit, in the recess 17. An uncontrolled advance of the traction means is thus prevented during normal operation. After production of the working pressure in the pressure chamber 10, the defined holding force is exceeded owing to the take-off force imparted by the tensioner drive and the piston movement is liberated for tensioning the seat belt. The piston fixing ring 19 is rigidly connected to the piston end 18, for example by caulking, so the piston fixing ring 19 remains rigidly connected to the piston end 18 during the tensioning process.

A sleeve 28 made of relatively rigid material is placed on the exterior of the piston end 18. This sleeve can be adapted to the conical shape of the piston end 18. The piston is axially supported on the piston fixing ring 19 via this conical sleeve 28. An O-ring 20 of elastic material is provided plane-parallel to the piston fixing ring 19. When the piston 11 is driven during the tensioning process, the piston fixing ring 19 forms a bearing or a support for the O-ring 20. Uniformly resilient pressure forces are thus achieved on a ball ring of which the balls 29 form a reverse movement brake in a known manner in cooperation with the conical sleeve 28.

The tensioner drive is not shown in detail in the embodiment shown in FIG. 5. However, this embodiment also possesses the tensioner drive that is illustrated in conjunction with the embodiment in FIGS. 1 to 3 and is shown in detail in FIG. 4. The tensioner drive is fastened on the attachment 12 in the manner described hereinbefore.

In the embodiment in FIG. 5, a holding loop 25 is fixed between the two layers 23, 24. The holding loop 25 can also be formed by a steel cable having a diameter of about 4 mm. The two strands of the holding loop 25 are compressed in a sleeve 36 preferably consisting of aluminum. A strand which projects from the sleeve 36 and which can be formed by one or both of the strands of the holding loop 25 is bent substantially in the form of a U and laid round the anchoring point 22 formed in the two layers 23, 24 of the fastening tab 21. When anchoring on the vehicle body, the projecting strand 30 is fixed between the two layers 23, 24 of the fastening tab 21 and anchored with them on the vehicle body. An end fitting or a buckle of an adjacent seat belt can be connected to the holding loop 25. The embodiment shown in FIG. 5 is preferably suitable for a central position on the back seat of a motor vehicle.

Serial anchoring means can be used for anchoring on the vehicle body. As shown in particular, only one anchoring point is required for anchoring the deflection device and the tensioner drive rigidly connected thereto.

Figure 6:
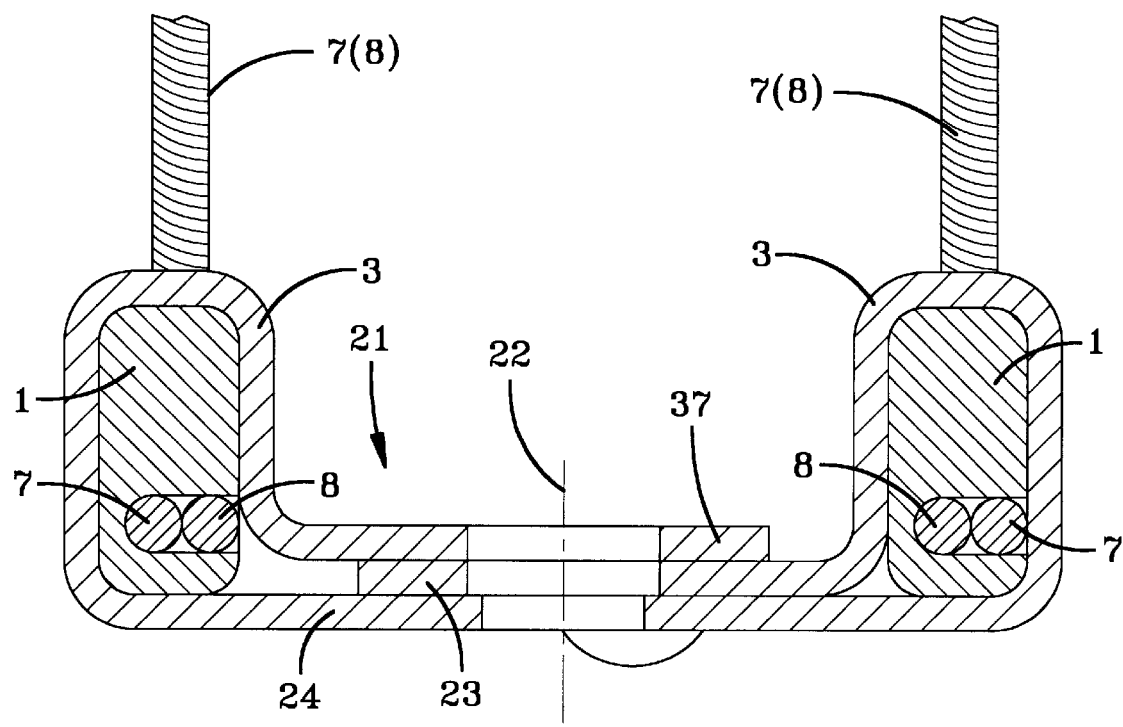
FIG. 6 shows a further embodiment.

In the embodiment shown in FIG. 6, two tensioner drives are connected to the vehicle body at one common anchoring point 22. For this purpose, two fastening sleeves 3 are formed from the single piece of sheet metal. Starting from the center of the piece of sheet metal in which the anchoring point 22 is provided, this is shaped into the two fastening sleeves 3 substantially symmetrically to the center. The ends of the piece of sheet metal are placed on top of one another in an overlapping manner so that the three-layered fastening tab 21 is formed between the two fastening sleeves 3. For this purpose, the two end pieces of the piece of sheet metal are placed on top of one another on the piece of sheet metal which is located between the two fastening sleeves 3 and which forms the lowest layer 24. As shown in FIG. 6, the three layers 23, 24 and 37 of the fastening tab 21 are formed in this way. Like the above-described embodiments, the fastening tab possesses a borehole in which an anchoring means, for example a screw connection, can be inserted for anchoring on the vehicle body.

The two fastening sleeves 3 embrace the block-shaped deflection devices 1 in an interlocking manner, as in the above-described embodiments. These are designed in the manner described in the above-described embodiments. The tensioner drives, not shown in detail, are fastened on the two block-shaped deflection devices 1 in the manner illustrated in the above-described embodiments. In this way, two tensioner drives which are intended, in particular, for back seats or for a back bench in the back region of a motor vehicle are fastened on the vehicle body by a single central anchoring device 22. As shown in FIG. 6, the anchoring point 22 is located centrally between the two deflection devices 1 embraced by the fastening sleeves 3.

What is claimed is:

1. A seat belt tensioner comprising:
   a means for providing traction which transmits a tensioning drive movement to a seat belt;
   a deflection device for anchoring the seat belt tensioner to a vehicle body, said deflection device comprising a guide channel for the means for providing traction which is located in a vertical guide plane substantially parallel to the longitudinal direction of the vehicle, the deflection device being fixed in a fastening sleeve which embraces the deflection device and is anchored on the vehicle body, wherein a projection on an external face of the deflection device interlocks with a corresponding recess in the fastening sleeve.

2. The seat belt tensioner according to claim 1 wherein owing to the projection on the external face of the deflection device interlocking with the corresponding recess in the fastening sleeve, the deflection device, in an anchoring plane which is perpendicular to the guide plane and in which the fastening sleeve is anchored on the vehicle body, is fixed longitudinally and against rotation with respect to an axis perpendicular to the anchoring plane on the fastening sleeve.

3. The seat belt tensioner according to claim 2 wherein a fastening tab that is located in the anchoring plane, and the fastening tab can be fastened to an anchoring point on the vehicle body.

4. The seat belt tensioner according to claim 3, wherein the fastening tab is formed in two layers.

5. The seat belt tensioner according to claim 3 wherein a holding loop is fixed between two layers of the fastening tab.

6. The seat belt tensioner according to claim 5 wherein a strand projecting from the holding loop is laid round the anchoring point and is clamped between the two layers of the fastening tab.

7. The seat belt tensioner according to claim 3 wherein the fastening sleeve and the fastening tab are formed from a single piece of sheet metal.

8. The seat belt tensioner according to claim 1 wherein a deflection angle of the means for providing traction is smaller than 90°.

9. The seat belt tensioner according to claim 1 wherein the means for providing traction comprises two traction strands that are rotated through about 90° along the guide channel.

10. The seat belt tensioner according to claim 9, wherein the traction strands, near an inlet end of the guide channel are rotated through 90° and are guided with an identical deflection radius in the guide channel.

11. The seat belt tensioner according to claim 1 wherein the guide channel comprises two different radii of curvature of which the part of the guide channel adjacent to an inlet end of the guide channel has a smaller radius of curvature.

12. The seat belt tensioner according to claim 1 further comprising a tensioner drive that comprises a piston which is guided linearly during tensioning and a pressure chamber into which a propellant gas can be introduced for driving the piston, wherein the pressure chamber is formed at least in part on an attachment shaped integrally on the deflection device.

13. The seat belt tensioner according to claim 12, wherein for linear guidance of the piston, a guide tube is fastened on the attachment and, in normal operation when the tensioner drive is not providing tensioning, the piston is mounted on the attachment.

14. The seat belt tensioner according to claim 13 wherein the guide tube is fixed with an interlocking fit on the exterior of the attachment of the deflection device.

15. The seat belt tensioner according to claim 14 wherein a tubular casing of the guide tube is pressed into one or more indentations in the attachment.

16. The seat belt tensioner according to claim 12 wherein the pressure chamber is sealed from an outlet end of the guide channel by a sealing washer.

17. The seat belt tensioner according to claim 16 wherein a recess that at least partially embraces the pressure chamber is formed in the attachment, wherein the sealing washer is arranged on a bottom of the recess and the piston is fixed in the recess by a piston end.

18. The seat belt tensioner according to claim 17 wherein the piston end is held in the recess with a specific holding force by means of a piston fixing ring inserted in an interlocking manner into the recess.

* * * * *